(12) United States Patent
Ray et al.

(10) Patent No.: US 11,851,563 B2
(45) Date of Patent: Dec. 26, 2023

(54) PROCESS AND FORMULATION FOR PRODUCING A POLYAMIDE HAVING LOW CAPROLACTAM CONCENTRATION AND SPECIFIC RELATIVE VISCOSITY

(71) Applicant: ASCEND PERFORMANCE MATERIALS OPERATIONS LLC, Houston, TX (US)

(72) Inventors: Jacob Ray, Pace, FL (US); Chris Schwier, Pensacola, FL (US); Douglas Claire Hoffman, Pensacola Beach, FL (US); Muhamad Fouad, Pensacola, FL (US)

(73) Assignee: Ascend Performance Materials Operations LLC, Houston, TX (US)

( * ) Notice: Subject to any disclaimer, the term of this patent is extended or adjusted under 35 U.S.C. 154(b) by 0 days.

(21) Appl. No.: 17/751,949

(22) Filed: May 24, 2022

(65) Prior Publication Data

US 2022/0325101 A1    Oct. 13, 2022

Related U.S. Application Data

(62) Division of application No. 16/545,671, filed on Aug. 20, 2019, now Pat. No. 11,345,815.

(60) Provisional application No. 62/721,259, filed on Aug. 22, 2018.

(51) Int. Cl.
| | | |
|---|---|---|
| *C08L 77/02* | (2006.01) | |
| *C08G 69/16* | (2006.01) | |
| *C08G 69/46* | (2006.01) | |
| *B01J 31/02* | (2006.01) | |
| *B01J 27/187* | (2006.01) | |

(52) U.S. Cl.
CPC .............. *C08L 77/02* (2013.01); *C08G 69/16* (2013.01); *C08G 69/46* (2013.01); *B01J 27/187* (2013.01); *B01J 31/0258* (2013.01); *B01J 31/0261* (2013.01)

(58) Field of Classification Search
CPC ........... C08L 2205/02; C08L 2205/025; C08L 77/02; C08L 77/04; C08L 77/06
See application file for complete search history.

(56) References Cited

U.S. PATENT DOCUMENTS

| | | |
|---|---|---|
| 4,053,457 A | 10/1977 | Cordes et al. |
| 6,069,228 A | 5/2000 | Alsop et al. |
| 6,476,181 B1 | 11/2002 | Alsop et al. |
| 8,722,844 B1 | 5/2014 | Facinelli et al. |
| 2016/0009869 A1 | 1/2016 | Biedasek et al. |

FOREIGN PATENT DOCUMENTS

| | | |
|---|---|---|
| CN | 108350235 | 7/2018 |
| TW | 201821537 | 6/2018 |
| WO | 2017058857 | 4/2017 |

OTHER PUBLICATIONS

International Application No. PCT/US2019/047381, "International Search Report and Written Opinion", dated Nov. 28, 2019, 11 pages.
Taiwan Application No. TW108129813, Office Action dated May 12, 2020, 9 pages.

*Primary Examiner* — Ana L. Woodward
(74) *Attorney, Agent, or Firm* — COZEN O'CONNOR (57) ABSTRACT

A base polyamide composition comprising a nylon mixture having caprolactam units from 1 wppb to 50 wppm catalyst composition; and greater than 0.75 wt % residual caprolactam, wherein the base polyamide composition has a delta end group level ranging from 30 μeq/gram to 90 μeq/gram.

15 Claims, 2 Drawing Sheets

PROCESS AND FORMULATION FOR PRODUCING A POLYAMIDE HAVING LOW CAPROLACTAM CONCENTRATION AND SPECIFIC RELATIVE VISCOSITY

CROSS-REFERENCE TO RELATED APPLICATIONS

The present application is a divisional application of U.S. patent application Ser. No. 16/545,671, filed Aug. 20, 2019, which is incorporated herein by reference in its entirety, and which claims priority to and filing benefit from U.S. Provisional Patent Application No. 62/721,259, filed on Aug. 22, 2018, and which is incorporated herein by reference in its entirety.

FIELD

The present disclosure relates generally to polyamide formulations and to processes for producing polyamides. More specifically, the present disclosure relates to processes for producing polyamides using a solid state polymerization step which yields a polyamide composition having a low residual caprolactam concentration and/or a preferred relative viscosity.

BACKGROUND

Nylon-6; nylon-6,6; and various copolymers thereof have been widely used in various applications, e.g., film formation, extrusion, (injection) molding, fiber, and food packaging films, because of their advantageous properties. These polymers/copolymers are formed via a polymerization reaction, as is well known.

In some cases, the caprolactam monomers used in the polymerization reaction to form the polymers/copolymers may not entirely polymerize into high molecular caprolactam monomers and oligomers. This residual caprolactam must then be removed because, among others, it contributes to production inefficiencies such as plate out on equipment, e.g., dies; presents problems relating to industry limits for food contact applications, and presents an unpleasant volatile odor. In conventional processes, residual caprolactam may be removed by extraction with hot water. The monomeric caprolactam in the extraction water can be purified and cleaned to recapture caprolactam, which can be recycled to the polymerization reactor. It is also possible to react the oligomers obtained in the extraction water back into caprolactam monomers by adding splitting reagents then isolating and washing to yield the monomers, which may then be reused. Also, U.S. Pat. No. 4,053,457 discloses a process for the manufacture of polyamides from ε-caprolactam and/or other polyamide-forming starting compounds by polymerization and subsequent extraction of the polymer. The extract containing solvent, monomer, and oligomers is concentrated in the absence of atmospheric oxygen. The surfaces that come into contact with the extract are made of materials that are inert under the conditions of the concentration process. The resultant concentrate, without further purification or separation, is polymerized by itself or together with other polyamide-forming starting compounds.

In many of these situations, it is desirable for the final polymer/copolymer (collectively polymer(s)) to exhibit higher relative viscosity (RV), molecular weight, (in combination with lower volatile, e.g., residual caprolactam, concentration). Molecular weight may be increased by utilizing a solid phase polymerization (SSP) process/operation, which is preferably employed after the crude polymer is polymerized and washed. As one example, SSP may be carried out by passing a hot inert gas flow through a heated bed of polymer pellets/granules. As another example, U.S. Pat. No. 6,069,228 discloses a process for preparing polyamide polymers via prepolymer formation in a reactor system comprising a reactor, flasher and separator, crystallization of the prepolymer under controlled temperature conditions and the subsequent conversion of these crystallized prepolymers to high molecular weight polymer via SSP. Also, U.S. Pat. No. 6,476,181 discloses a process for increasing the molecular weight of nylon 6 while reducing its content of caprolactam and other volatiles by a two-staged heating process.

The compositional and performance properties of the polymer, e.g., polyamide, are often in conflict with one another, and processing to achieve a low caprolactam concentration may have an adverse effect on molecular weight or RV build, among others. As one example if caprolactam removal requires more SSP time than does the molecular weight increase, then the resultant molecular weight will build for too long and will be excessively high at the end of the SSP operation. In some cases, the build rate of the RV and/or the molecular weight over time has a non-linear profile, which leads to control problems. Generally speaking, conventional polymer products have been unable to achieve low caprolactam concentration in combination with desirable molecular weight and/or relative viscosity, especially where the initial pre-SSP polymer has a high molecular weight and a high caprolactam concentration.

In addition to the challenges related to the compositional and performance properties, the overall pellet quality of conventional polyamide compositions has been found to be adversely affected by the SSP process.

An advantage of Nylon-6,6, aside from higher thermal performance, is its cleanliness. In contrast, use of other polymers has been found to result in thermal reversibility, thereby resulting in even more residual caprolactam monomer, see M. Kohan, *Nylon Plastics Handbook*, 1995. This issue is especially germane in film-related applications. This outcome is undesirable as extractable monomer levels are known to adversely compromise safeness and approvals for food contact applications, see Food and Drug Administration, HHS, 21 CFR Ch. I, 4-1-02 Edition, 2002.

Even in view of the references, the need exists for a base polyamide composition that is capable of forming, preferably via an SSP process/operation, final polyamide compositions having a low residual caprolactam concentrations, desirable final RVs, and other beneficial pellet-related properties.

All of the references discussed herein are hereby incorporated by reference.

SUMMARY

In some embodiments, this disclosure relates to a process for producing a polyamide composition having a low residual caprolactam concentration, the process comprising the steps of providing a base polyamide composition and processing the base polyamide composition to form the final polyamide composition. The base polyamide composition may comprise a nylon mixture having caprolactam units, e.g., greater than 1.4 wt % caprolactam units; from 1 wppb to 50 wppm of a catalyst composition; and residual caprolactam, and may have a melting point ranging from 180° C. to 255° C. The base polyamide composition may have an initial residual caprolactam concentration, e.g. greater than 0.75 wt %, an initial relative viscosity, e.g., less than 55, and a delta end group level ranging from 30 µeq/gram to 90 µeq/gram and/or a delta end group level greater than 50 µeq/gram. The nylon mixture may comprise from 1 wt % to 80 wt % nylon-6 and from 20 wt % to 99 wt % nylon-6/6. The base polyamide composition may be produced by melt polymerizing a polyamide composition and pelletizing the melted polyamide composition to form polyamide pellets. In some cases, the catalyst composition comprises phosphorous acid; phosphonic acid; alkyl- and aryl-substituted phosphonic acids; 2-pyridylethyl phosphonic acid; hypophosphorous acid; alkyl-, aryl- and alkyl-/aryl-substituted phosphinic acids; phosphoric acid; esters and salts of these phosphorous-containing acids; manganese hypophosphite; sodium hypophosphite; benzene phosphinic acid; or monosodium phosphate; or any combinations thereof. The final polyamide composition may have a final residual caprolactam concentration, e.g., less than 0.75 wt %, a final relative viscosity, e.g., ranging from 40 to 350, and/or a color index ranging from −6 to 5. The final relative viscosity may be greater than the initial relative viscosity, e.g., at least 10% greater than the initial relative viscosity and the final residual caprolactam concentration is at least 5% less than the initial residual caprolactam concentration. During processing, the initial relative viscosity may increase at a build rate that is substantially linear. In some cases, the processing comprises solid state polymerization, which may comprise heating the base polyamide. The processing may be conducted for a build time less than 30 hours, and optionally at a temperature ranging from 150° C. to 250° C., e.g., from 170° C.-190° C. and optionally at a pressure less than atmospheric pressure. The final polyamide composition may comprise less than 10 wt % tinting agent and/or the base polyamide composition may comprise less than 10 wt % tinting agent. In one embodiment, the base polyamide composition comprises from 0.1 wppm to 30 wppm catalyst composition, from 1 wt % to 8 wt % residual caprolactam and has a delta end group level ranging from 50 µeq/gram to 75 µeq/gram and has initial relative viscosity less than 35 and wherein the final polyamide composition comprises less than 0.5 wt % residual caprolactam and has a final relative viscosity greater than 45. In one embodiment, the base polyamide composition comprises from 1 wppb to 35 wppm phosphorus, greater than 1.5 wt % caprolactam and has a delta end group level greater than 50 µeq/gram and has initial relative viscosity less than 33 and wherein the processing is conducted at a pressure less than atmospheric pressure and a temperature ranging from 175° C. to 185° C., and wherein the final polyamide composition comprises less than 0.4 wt % residual caprolactam and has a final relative viscosity greater than 55, e.g., greater than 75.

In some embodiments, the disclosure relates to a process for producing a polyamides having a low residual caprolactam concentration, the process comprising the steps of providing the base polyamide composition and processing the base polyamide composition to form a final polyamide composition.

In some embodiments, the disclosure relates to a film formed from a final polyamide composition. The film may demonstrate a puncture resistance greater than 3 J/mm, an impact resistance greater than 1500 grams, and/or a tear resistance greater than 50 grams.

In some embodiments, the disclosure relates to a process for controlling the relative viscosity of a final polyamide composition, the process comprising the steps of providing a base polyamide composition having relative viscosity less than 40; determining a desired relative viscosity for the final polyamide composition; selecting at least one processing condition from catalyst content, delta end group level, temperature, pressure, and moisture content; and processing the base polyamide composition under the at least one processing condition and based on the desired relative viscosity to form the final polyamide composition having a final relative viscosity ranging from 55 to 200, e.g., from 75 to 200.

In some cases, the disclosure relates to a process for controlling the caprolactam content of a final polyamide composition, the process comprising the steps of providing a base polyamide composition having residual caprolactam content greater than 0.6 wt %; determining a desired residual caprolactam content for the final polyamide composition; selecting at least one processing condition from catalyst content, delta end group level, temperature, pressure, and moisture content; and processing the base polyamide composition under the at least one condition and based on the desired residual caprolactam content to form the final polyamide composition having a residual caprolactam content less than 0.4 wt %.

In one embodiment, the disclosure relates to a process for manufacturing a final polyamide composition, the process comprising the steps of providing a base polyamide composition having one or more initial properties comprising initial caprolactam content, initial relative viscosity, and initial color index; determining one or more desired final properties for the final polyamide composition product, the properties comprising final caprolactam content, final relative viscosity, and color index; and processing the base polyamide composition under one or more process conditions comprising catalyst content, delta end group level, temperature, pressure, and moisture content and based on the desired final property to provide the final polyamide composition.

In some embodiments, the present disclosure relates to a process for producing a polyamide composition having a low residual caprolactam concentration, the process comprising the steps of: (a) providing a base polyamide composition comprising: a nylon mixture having caprolactam units; from 1 wppb to 50 wppm of a catalyst composition; and residual caprolactam, and having an initial residual caprolactam concentration and an initial relative viscosity; (b) processing the base polyamide composition to form the final polyamide composition having a final residual caprolactam concentration and a final relative viscosity. In some cases, the base polyamide composition has a delta end group level ranging from 30 µeq/gram to 90 µeq/gram. In some cases, the initial residual caprolactam concentration is greater than 0.75 wt %, based on the total weight of the base polyamide composition, and the final residual caprolactam concentration is less than 0.75 wt %, based on the total weight of the final polyamide composition. In some cases, the final relative viscosity ranges from 40 to 350. In some cases, the processing is conducted for a build time ranging from 2 hours to 30 hours, and a temperature ranging from 150° C.-250° C. In some cases, the final polyamide composition has a color index ranging from −6 to 5, as measured by ASTM E313 (2018). In some cases, the final relative viscosity is greater than the initial relative viscosity, wherein the final relative viscosity is at least 10% greater than the initial relative viscosity. In some cases, the base polyamide composition has a melting point ranging from 180° C. to 255° C. In some cases, the nylon mixture of the base polyamide composition comprises: from 1 wt % to 80 wt % nylon-6; and from 20 wt % to 99 wt % nylon-6/6. In some cases, processing comprises solid state polymerization, which comprises heating the base polyamide. In some cases, the base polyamide composition is produced by melt polymerizing a polyamide composition and pelletizing the melted polyamide composition to form polyamide pellets. In some cases, the catalyst composition comprises phosphorous acid; phosphonic acid; alkyl- and aryl-substituted phosphonic acids; 2-pyridylethyl phosphonic acid; hypophosphorous acid; alkyl-, aryl- and alkyl-/aryl-substituted phosphinic acids; phosphoric acid; esters and salts of these phosphorous-containing acids; manganese hypophosphite; sodium hypophosphite; benzene phosphinic acid; monosodium phosphate; or any combinations thereof. In some cases, the base polyamide composition comprises from 0.1 wppm to 30 wppm catalyst composition, from 1 wt % to 8 wt % residual caprolactam, has a delta end group level ranging from 50 µeq/gram to 75 µeq/gram, and has initial relative viscosity less than 35, and the final polyamide composition comprises less than 0.6 wt % residual caprolactam and has a final relative viscosity greater than 45. In some cases, the base polyamide composition comprises from 1 wppb to 35 wppm phosphorus, greater than 1.5 wt % residual caprolactam, a delta end group level greater than 50 µeq/gram and has initial relative viscosity less than 33, wherein the processing is conducted at a pressure less than atmospheric pressure and a temperature ranging from 175° C. to 185° C., and wherein the final polyamide composition comprises less than 0.4 wt % residual caprolactam and has a final relative viscosity greater than 55, e.g., greater than 75. In some cases, during processing, the RV build rate ranges from 1 to 30 RV units/hour.

In some embodiments, the present disclosure relates to a base polyamide composition comprising: a nylon mixture having caprolactam units; from 1 wppb to 50 wppm catalyst composition; and greater than 0.75 wt % residual caprolactam; wherein the base polyamide composition has a delta end group level ranging from 30 µeq/gram to 90 µeq/gram. In some cases, the base polyamide composition has a delta end group level greater than or equal to 45 µeq/ram. In some cases, the base polyamide comprises greater than 1.4 wt % caprolactam units, based on the total weight of the base polyamide composition, and wherein the base polyamide has a relative viscosity less than 55. In some cases, the nylon mixture of the base polyamide composition comprises: from 1 wt % to 50 wt % nylon-6; and from 20 wt % to 99 wt % nylon-6/6, wherein the catalyst composition comprises phosphorous acid; phosphonic acid; alkyl- and aryl-substituted phosphonic acids; 2-pyridylethyl phosphonic acid; hypophosphorous acid; alkyl-, aryl- and alkyl-/aryl-substituted phosphinic acids; phosphoric acid; esters and salts of these phosphorous-containing acids; manganese hypophosphite; sodium hypophosphite; benzene phosphinic acid; monosodium phosphate; or any combinations thereof.

In some embodiments, the present disclosure relates to a film formed from a final polyamide composition comprising: polyamide monomers; less than 0.75 wt % residual caprolactam, wherein the final polyamide composition has a delta end group level ranging from 30 µeq/gram to 90 µeq/gram and a melting point ranging from 205° C. to 255° C. In some cases, the film demonstrates: a puncture resistance greater than 3 J/mm as measured via ASTM F1366 (2018), an impact resistance greater than 1500 grams as measured via ASTM D1709. A (2018), and/or a tear resistance greater than 50 grams as measured via ASTM D1922 (2018).

BRIEF DESCRIPTION OF THE DRAWINGS

The disclosure references the appended drawings.

DETAILED DESCRIPTION

Introduction

Conventional processes for producing final polyamide compositions often employ a polymerization step to form a base polyamide composition followed by solid phase polymerization (SSP) of the base polyamide to form the final polyamide compositions. As noted above however, these processes yield final polyamide compositions that have, among other drawbacks, high residual caprolactam concentrations and/or undesirable relative viscosities (RVs). In addition to these compositional and performance deficiencies, the overall pellet quality of conventional final polyamide compositions has been found to be poor. For example, typical final polyamide compositions exhibit poor color quality, e.g., high yellowing indices; high levels of black specks; and/or high degrees of pellet size non-uniformity. It is postulated that the use of the SSP process exacerbates the compositional shortcomings of the conventional base polyamide compositions and further contributes to these problems.

The inventors have now discovered base polyamide compositions comprising specific components and having particular properties, that, when processed via SSP, provide for a final polyamide compositions that demonstrate beneficial combinations of features. It has been found that the use of a low concentrations of catalyst, optionally in combination with specific delta end group (DEG) levels, provides for the desirable final polyamide compositions. For example, the base polyamides disclosed herein may yield final polyamide compositions having an advantageous combination of low residual caprolactam content, e.g., less than 0.75 wt %, and a desirable RV, e.g. ranging from 40 to 350, as measured via the 90% formic acid method (additional ranges and limits for these features are disclosed herein). In contrast, conventional base polyamide compositions, when processed via SSP, may provide for one of these characteristics, but not more than one, e.g., not low caprolactam concentration and desired RV in combination.

Without being bound by theory, the use of the disclosed base polyamide compositions provides for a consistent, controllable RV build rate during SSP, e.g., a substantially linear or linear build rate. This build rate provides for synergistic control of RV build and removal of residual caprolactam, e.g., by providing the ability to manipulate the RV-to-build time ratio. The disclosed base polyamide compositions also provide the potential to effectively "tune" the process based on factors to arrive at a preferred final composition. For example, at the controlled build rates, the build time can be controlled, e.g., to less than 30 hours. As a result, the rate of RV build and the rate of caprolactam removal synergize with one another. As an example, when the rate of RV build ranges from 1 to 30 hours, then the caprolactam has enough time to react or diffuse out of the polyamide composition—both the RV target and the caprolactam removal target are achieved in similar time frames. It is postulated that the use of higher amounts of catalyst, e.g., at least 50 wppm, (as is conventionally done) detrimentally contributes to build rates that are too rapid, which do not allow sufficient time for caprolactam removal. With conventional base polyamides and SSP processes, the caprolactam removal takes too much or too little time and RV builds to an undesirable level or fails to build to a desirable level.

In addition, it has been found that the use of the base polyamides and SSP processes disclosed herein provide for a product having beneficial overall pellet quality, e.g., good color quality (low yellowing indices); low levels of black specks; and/or high degrees of pellet size uniformity. In particular, the inventors have found that the use of the specific amounts of catalyst has surprisingly been found to retard yellowing. Without being bound by theory, it is believed that lower catalyst concentrations have a beneficial effect on color. For example, the related amount of hydrogen (radicals) donated by these catalysts, e.g., phosphite catalysts, may retard polymer oxidation, which leads to poor color qualities. The lower amounts of catalyst have been found to favor catalysis versus other color-causing side reactions, e.g., oxidation—the lower amounts of catalyst seem to demonstrate an anti-oxidizing benefit (in addition to the catalytic effects). Higher amounts of catalyst, in contrast, may provide hydrogen amounts that result in a build rate is too steep and/or non-linear. Thus, the disclosed amounts of catalyst advantageously both retard oxidation and provide for beneficial build rates (along with color-related and other benefits). As a result of the improved color quality, the resultant final polyamide compositions advantageously require little if any tinting agents, e.g., blue dyes, which are often employed in conventional polyamide compositions to offset poor color quality.

In one embodiment, a base polyamide composition is disclosed. The base polyamide composition comprise a nylon mixture, a catalyst composition, and (at least some) residual caprolactam. The nylon mixture includes some polymers having caprolactam units (non-residual caprolactam). In some cases, the residual caprolactam is present in the specific amounts disclosed herein, e.g., at least 0.75 wt %, and the catalyst composition is present in the specific amount disclosed herein, e.g., from 1 wppb to 50 wppm. The base polyamide composition has an initial residual caprolactam concentration and an initial RV, which are discussed in more detail below. The nylon mixture, in some embodiments, comprises or has caprolactam (nylon-6 or PA-6) units. In some embodiments, the base polyamide composition has a specific delta end group level, e.g., a DEG level ranging from 35 µeq/gram to 85 µeq/gram.

In addition to the base polyamide compositions themselves, it has now been discovered that the use of particular SSP parameters, in conjunction with the base polyamide compositions, provides for surprising compositional benefits in the final polyamide composition and for process related efficiencies. These SSP parameters and benefits are discussed in detail below. Thus, in one embodiment, a process for producing a polyamide having a low residual caprolactam concentration is disclosed. The process comprises the steps of providing the base polyamide composition and processing the base polyamide composition to form the final polyamide composition, which has a final residual caprolactam concentration and a final RV. In addition, the combinations of these features can beneficially be employed in a "tunable" manner to produce a final polyamide composition having a target properties. The tunable processes are discussed in more detail below.

Catalyst

The catalyst may vary widely, and there are many suitable catalyst compositions known in the art. As some examples, the catalyst composition may comprise phosphorous acid; phosphonic acid; alkyl- and aryl-substituted phosphonic acids; 2-pyridylethyl phosphonic acid; hypophosphorous acid; alkyl-, aryl- and alkyl-/aryl-substituted phosphinic acids; phosphoric acid; esters and salts of these phosphorous-containing acids; manganese hypophosphite; sodium hypophosphite; benzene phosphinic acid; or monosodium phosphate; or any combination, e.g., 2 or more, thereof. Esters and salts of these phosphorous-containing acids include, but are not limited to, alkyl, aryl and alkyl/aryl esters, metal salts, ammonium salts, and ammonium alkyl salts.

Preferably, the catalyst composition comprises manganese hypophosphite, or sodium hypophosphite or any combination thereof. The aforementioned catalysts are commercially available products.

As noted above, the catalyst composition is present in specific amounts, which have been found to contribute to surprising benefits. In some embodiments, the base polyamide composition comprises from 1 wppb to 50 wppm catalyst composition, e.g., from 1 wppb to 40 wppm, from 1 wppb to 37 wppm, from 10 wppb to 37 wppm, from 10 wppb to 35 wppm, from 0.1 wppm to 35 wppm, from 0.1 wppm to 30 wppm, from 0.1 wppm to 25 wppm, from 0.1 wppm to 20 wppm, from 0.5 wppm to 15 wppm, from 0.5 wppm to 10 wppm; from 1 wppm to 20 wppm, from 2 wppm to 25 wppm, from 2 wppm to 20 wppm, from 1 wppm to 10 wppm, from 2 wppm to 15 wppm, from 3 wppm to 11 wppm, or from 4 wppm to 10 wppm. In terms of upper limits, the base polyamide composition may comprise less than 50 wppm catalyst composition, e.g., less than 40 wppm, less than 35 wppm, less than 30 wppm, less than 25 wppm, less than 20 wppm, less than 15 wppm, less than 12 wppm, less than 11 wppm, less than 10 wppm, less than 8 wppm, less than 6 wppm, less than 5 wppm, less than 4 wppm, or less than 3 wppm. In terms of lower limits, the base polyamide composition may comprise greater than 1 wppb catalyst composition, e.g., greater than 10 wppb, greater than 0.1 wppm, greater than 0.3 wppm, greater than 0.5 wppm, greater than 0.7 wppm, greater than 1 wppm, greater than 1.2 wppm, greater than 1.5 wppm, greater than 1.7 wppm, greater than 2 wppm, greater than 2.5 wppm, greater than 3 wppm, greater than 3.5 wppm, greater than 4 wppm, greater than 5 wppm, greater than 7 wppm, or greater than 10 wppm.

"Wppm" and "wppb," as used herein, mean weight parts per million or weight parts per billion, respectively, and are based on the total weight of the entire respective composition, e.g., the total weight of the entire base polyamide composition or the entire final polyamide composition. Likewise, weight percentages are based on the total weight of the entire respective composition.

In one embodiment, the catalyst composition comprises an inorganic component, e.g., a phosphorus-containing component, such as inorganic phosphites. In these cases, the base polyamide composition comprises from 1 wppb to 25 wppm phosphorus, e.g., from 1 wppb to 20 wppm, from 10 wppb to 20 wppm, from 0.1 wppm to 20 wppm, from 0.5 wppm to 20 wppm, from 1 wppm to 20 wppm, from 1 wppm to 15 wppm, from 2 wppm to 15 wppm, from 3 wppm to 12 wppm, from 3 wppm to 13 wppm from 4 wppm to 20 wppm;

from 4 wppm to 15 wppm, from 4 wppm to 12 wppm, from 10 wppm to 20 wppm, from 5 wppm to 15 wppm, from 5 wppm to 10 wppm, from 10 wppm to 16 wppm, or from 11 wppm to 15 wppm. In terms of upper limits, the base polyamide composition may comprise less than 25 wppm phosphorus, e.g., less than 20 wppm, less than 18 wppm, less than 16 wppm, less than 15 wppm, less than 14 wppm, less than 13 wppm, less than 12 wppm, less than 11 wppm, less than 10 wppm, less than 9 wppm, less than 8 wppm, less than 7 wppm, less than 6 wppm, less than 5 wppm, less than 4 wppm, or less than 3 wppm. In terms of lower limits, the base polyamide composition may comprise greater than 1 wppb phosphorus, e.g., greater than 10 wppb, greater than 0.1 wppm, greater than 0.3 wppm, greater than 0.5 wppm, greater than 0.7 wppm, greater than 1 wppm, greater than 1.2 wppm, greater than 1.5 wppm, greater than 1.7 wppm, greater than 2 wppm, greater than 2.5 wppm, greater than 3 wppm, greater than 3.5 wppm, greater than 4 wppm, or greater than 5 wppm.

End Groups

As used herein, delta end groups (DEG or DEGs) are defined as the quantity of amine ends (—NH$_2$) less the quantity of carboxylic acid ends (—COOH). DEG calculation methods are well known.

As noted above, the base polyamide composition utilizes particular ranges and/or limits of DEG levels. In some embodiments, the base polyamide composition has a DEG level ranging from 30 μeq/gram to 90 μeq/gram, e.g., from 35 μeq/gram to 85 μeq/gram, from 35 μeq/gram to 80 μeq/gram, from 40 μeq/gram to 75 μeq/gram, from 50 μeq/gram to 75 μeq/gram, from 40 μeq/gram to 70 μeq/gram, from 42 μeq/gram to 68 μeq/gram, from 45 μeq/gram to 60 μeq/gram, from 45 μeq/gram to 65 μeq/gram, from 47 μeq/gram to 63 μeq/gram, from 48 μeq/gram to 58 μeq/gram, 50 μeq/gram to 60 μeq/gram, or from 52 μeq/gram to 57 μeq/gram. In terms of upper limits, the base polyamide composition may have a DEG level less than 85 μeq/gram, e.g. less than 80 μeq/gram, less than 75 μeq/gram, less than 70 μeq/gram, less than 68 μeq/gram, less than 65 μeq/gram, less than 63 μeq/gram, less than 60 μeq/gram, less than 58 μeq/gram, less than 55 μeq/gram, less than 53 μeq/gram, or less than 50 μeq/gram. In terms of lower limits, the base polyamide composition may have a DEG level greater than 35 μeq/gram, e.g., greater than 40 μeq/gram, greater than 42 μeq/gram, greater than 45 μeq/gram, greater than 48 μeq/gram, greater than 50 μeq/gram, or greater than 52 μeq/gram. Again, the utilization of the specific DEG levels provides for the unexpected combination of advantageous, synergistic properties in the final polyamide compositions. These ranges and limits may be important, for example, when the amine end balance may be important for secondary operations, e.g., tie layer bonding, adhesion, or secondary chemistry considerations, e.g., reactions with epoxies.

In other applications, higher amine end content may not be desired. For example the amine end balance may not be important for secondary operations or may have an adverse impact, in which case an excess of carboxylic acid ends may be desired. In some embodiments, the base polyamide composition has a DEG level ranging from −31 μeq/gram to −90 μeq/gram, e.g., from −35 μeq/gram to −85 μeq/gram, from −35 μeq/gram to −80 μeq/gram, from −40 μeq/gram to −75 μeq/gram, from −50 μeq/gram to −75 μeq/gram, from −40 μeq/gram to −70 μeq/gram, from −42 μeq/gram to −68 μeq/gram, from −45 μeq/gram to −60 μeq/gram, from −45 eq/gram to −65 μeq/gram, from −47 μeq/gram to −63 μeq/gram, from −48 μeq/gram to −58 eq/gram, −50 μeq/gram to −60 μeq/gram, or from −52 μeq/gram to −57 μeq/gram. In terms of lower limits, the base polyamide composition may have a DEG level greater than −85 μeq/gram, e.g. greater than −80 μeq/gram, greater than −75 μeq/gram, greater than −70 μeq/gram, greater than −68 μeq/gram, greater than −65 μeq/gram, greater than −63 μeq/gram, greater than −60 μeq/gram, greater than −58 μeq/gram, greater than −55 μeq/gram, greater than −53 μeq/gram, or greater than −50 μeq/gram. In terms of upper limits, the base polyamide composition may have a DEG level less than −30 μeq/gram, e.g., less than −35 μeq/gram, less than −40 μeq/gram, less than −42 μeq/gram, less than −45 μeq/gram, less than −48 μeq/gram, less than −50 μeq/gram, or less than −52 μeq/gram. These specific DEG levels have also been found to provide for the unexpected combination of advantageous, synergistic properties in the final polyamide compositions.

In some cases, DEG level may be obtained/achieved/controlled by controlling the amount of excess hexamethylene diamine (HMD) in the polymerization reaction mixture. HMD is believed to be more volatile than the (di) carboxylic acids that are employed in the reaction, e.g. adipic acid. The HMD and the carboxylic acids act to balance the formula (based on the theoretical values for the end groups), and the balance between the two (and hence the DEG) can be adjusted to achieve desired properties in the polyamide compositions.

In some cases, the DEG level may be obtained/achieved/controlled via the incorporation of (mono) acids and/or (mono) amines, e.g., by "capping" some of the end structures to arrive at the desired DEG level, e.g., the desired end group balance.

In some cases, the utilization of monofunctional end capping has been found to provide the surprising benefit of controlling, e.g., slowing, the rate of polymerization in the SSP process. Without being bound by theory, it is believed that the capping (1) limits the amount of reactive ends; and (2) limits the degree of polymerization to a finite number. In some cases, the more end capping that is employed, the lower the (maximum) molecular weight can be (at 100% conversion). Both the former and latter may be achieved by creating high DEG systems. The monofunctional addition will increase DEG level.

In one embodiment, the (mono) acids and/or (mono) amines are incorporated at levels ranging from 1 and 40 μeq/gram, e.g., from 1 μeq/gram to 35 μeq/gram, from 3 μeq/gram to 35 μeq/gram, from 3 μeq/gram to 30 μeq/gram, from 5 μeq/gram to 30 μeq/gram, from 5 μeq/gram to 25 μeq/gram, from 7 μeq/gram to 25 μeq/gram, from 7 μeq/gram to 20 μeq/gram, from 10 μeq/gram to 20 μeq/gram, or from 10 μeq/gram to 15 μeq/gram. In terms of upper limits, the (mono) acids and/or (mono) amines may be incorporated at levels less than 40 μeq/gram, e.g., less than 35 μeq/gram, less than 30 μeq/gram, less than 25 μeq/gram, less than 20 μeq/gram, or less than 15 μeq/gram. In terms of lower limits, the (mono) acids and/or (mono) amines may be incorporated at levels greater than 1 μeq/gram, e.g., greater than 3 μeq/gram, greater than 5 μeq/gram, greater than 7 μeq/gram, or greater than 10 μeq/gram.

Exemplary (mono) acids include but are not limited to acetic acid, proprionic acid, butyric acid, valeric acid, hexanoic acid, octanoic acid, palmitic acid, myristic acid, decanoic acid, undecanoic acid, dodecanoic acid, oleic acid, or stearic acid, or any combinations thereof. Exemplary (mono) amines include but are not limited to benzylamine, ethylamine, propylamine, butylamine, pentylamine, hexylamine, 2-ethyl-1-hexylamine, heptylamine, octylamine, nonylamine, decylamine, undecylamine, dodecylamine, amylamine, tert-butyl amine, tetradecylamine, hexadecylamine, or octadecylamine, or any combinations thereof.

Nylon Mixture

The nylon mixture may vary widely. In some embodiments, the nylon mixture may comprise PA-6, PA-6,6, PA4,6, PA-6,9, PA-6,10, PA-6,12, PA11, PA12, PA9,10, PA9,12, PA9,13, PA9,14, PA9,15, PA-6,16, PA9,36, PA10, 10, PA10,12, PA10,13, PA10,14, PA12,10, PA12,12, PA12, 13, PA12,14, PA-6,14, PA-6,13, PA-6,15, PA-6,16, PA-6,13, PAMXD,6, PA4T, PAST, PA-6T, PA9T, PA10T, PA12T, PA4I, PA5I, PA-6I, PA10I, copolymers, terpolymers, or any mixtures thereof. Copolymers, terpolymers, and mixtures thereof are contemplated as feedstock components, as long as the resultant feedstock, e.g., the base polyamide composition, comprises some caprolactam units.

In some aspects, the polyamide feedstock may comprise polyamides produced through ring-opening polymerization or polycondensation, including the copolymerization and/or copolycondensation, of lactams. For example, these polyamides may include, for example, those produced from propriolactam, butyrolactam, valerolactam, caprolactam, laurolactam, undecylolactam, and enantholactam. In some embodiments, the polyamide is a polymer derived from the polymerization of caprolactam, and as such, the nylon mixture includes some polymers having caprolactam units (non-residual caprolactam).

In one embodiment, the polyamide composition may comprise the polyamides produced through the copolymerization of a lactam with a nylon, for example, the product of the copolymerization of a caprolactam with PA-6,6.

In some embodiments, the nylon mixture may be the condensation products of one or more dicarboxylic acids, one or more diamines, one or more aminocarboxylic acids, and/or ring-opening polymerization products of one or more cyclic lactams, e.g., caprolactam and laurolactam. In some aspects, the polyamide feedstock may include aliphatic, aromatic, and/or semi-aromatic polyamides and can be homopolymer, copolymer, terpolymer or higher order polymers. In some aspects, the polyamide feedstock includes blends of two or more polyamides. In some embodiments, the polyamide feedstock comprises aliphatic or aromatic polyamides or blends of two or more polyamides.

In some aspects, the dicarboxylic acids may comprise one or more of adipic acid, azelaic acid, terephthalic acid, isophthalic acid, sebacic acid, and dodecanedioic acid. In some aspects, the dicarboxylic acids may comprise adipic, isophthalic and terephthalic acid. In some aspects, the dicarboxylic acids may comprise an aminocarboxylic acid, e.g., 11-aminododecanoic acid.

In some aspects, the diamines may comprise one or more of tetramethylenediamine, hexamethylenediamine, octamethylenediamine, nonamethylenediamine, 2-methylpentamethylenediamine, 2-methyloctamethylenediamine, trimethylhexamethylenediamine, bis(p-aminocyclohexyl)methane, m-xylylenediamine, p-xylylenediamine, decamethylenediamine, undecamethylenediamine, dodecamethylenediamine, tridecamethylenediamine, tetramethylenediamine, pentamethylenediamine, hexamethylenediamine, and the like. Other examples of the aromatic diamine components, which are merely illustrative, include benzene diamines such as 1,4-diaminobenzene, 1,3-diaminobenzene, and 1,2-diaminobenzene; diphenyl(thio)ether diamines such as 4,4'-diaminodiphenylether, 3,4'-diaminodiphenylether, 3,3'-diaminodiphenylether, and 4,4'-diaminodiphenylthioether; benzophenone diamines such as 3,3'-diaminobenzophenone and 4,4'-diaminobenzophenone; diphenylphosphine diamines such as 3,3'-diaminodiphenylphosphine and 4,4'-diaminodiphenylphosphine; diphenylalkylene diamines such as 3,3'-diaminodiphenylmethane, 4,4'-diaminodiphenylmethane, 3,3'-diaminodiphenylpropane, and 4,4'-diaminodiphenylpropane; diphenyl sulfide diamines such as 3,3'-diaminodiphenylsulfide and 4,4'-diaminodiphenylsulfide; diphenylsulfone diamines such as 3,3'-diaminodiphenylsulfone and 4,4'-diaminodiphenylsulfone; and benzidines such as benzidine and 3,3'-dimethylbenzidine.

In some aspects, the polyamide feedstock comprises physical blends of aliphatic polyamides, semiaromatic polyamides, and/or aromatic polyamides to obtain properties intermediate between or synergistic of the properties of each polyamide.

While much of the discussion above relates to polyamide feedstock, and in particular copolyamides of PA-6,6 and PA-6, it is contemplated that the processes and compositions described herein my include or relate to polyamides ranging from aliphatic polyamides (traditionally PA-6,6 and PA-6 or other aliphatic nylons) to copolyamides with aromatic components (for example paraphenylenediamine and terephthalic acid), to copolymers such as adipate with 2-methyl pentmethylene diamine and 3,5-diacarboxybenzenesulfonic acid (or sulfoisophthalic acid in the form of its sodium sulfonate salt).

Other polyamides are described in US Provisional Patent Application No. 62/690,748, which is incorporated by reference herein.

In one embodiment, the nylon mixture comprises nylon-6 and nylon-6,6. The nylon-6 may be present in the nylon mixture in an amount ranging from 1 wt % to 80 wt %, e.g., from 1 wt % to 60 wt %, from 1 wt % to 50 wt %, from 10 wt % to 60 wt %, from 5 wt % to 50 wt %, from 5 wt % to 40 wt %, from 7 wt % to 40 wt %, from 5 wt % to 35 wt %, from 10 wt % to 35 wt %, from 10 wt % to 30 wt %, or from 15 wt % to 30 wt %. In terms of upper limits, the nylon-6 may be present in the nylon mixture in an amount less than 80 wt %, e.g., less than 70 wt %, less than 60 wt %, less than 55 wt %, less than 50 wt %, less than 45 wt %, less than 40 wt %, less than 35 wt %, or less than 30 wt %. In terms of lower limits, the nylon-6 may be present in the nylon mixture in an amount greater than 1 wt %, e.g., greater than 2 wt %, greater than 3 wt %, greater than 4 wt %, greater than 5 wt %, greater than 7 wt %, greater than 10 wt %, greater than 12 wt %, greater than 15 wt %, greater than 20 wt %, greater than 25 wt %, or greater than 30 wt %.

The nylon-6,6 may be present in the nylon mixture in an amount ranging from 20 wt % to 99 wt %, e.g., from 40 wt % to 95 wt %, from 50 wt % to 95 wt %, from 55 wt % to 85 wt %, from 65 wt % to 95 wt %, from 60 wt % to 90 wt %, from 65 wt % to 90 wt %, from 70 wt % to 90 wt %, from 75 wt % to 85 wt %, or from 70 wt % to 85 wt %. In terms of upper limits, the nylon-6,6 may be present in the nylon mixture in an amount less than 99 wt %, e.g., less than 95 wt %, less than 90 wt %, less than 85 wt %, less than 80 wt %, less than 75 wt %, or less than 70 wt %. In terms of lower limits, the nylon-6,6 may be present in the nylon mixture in an amount greater than 20 wt %, e.g., greater than 40 wt %, greater than 50 wt %, greater than 55 wt %, greater than 60 wt %, greater than 65 wt %, greater than 70 wt %, or greater than 75 wt %.

The base polyamide composition may be produced by polymerizing caprolactam monomers (that may be within other mixtures such as nylon-6,6 salt), which provides for at least some caprolactam unit content in the nylon mixture. Such caprolactam units are not considered to be "residual" caprolactam. In some embodiments, the base polyamide composition comprises greater than 1.4 wt % caprolactam units, based on the total weight of the base polyamide composition, e.g., greater than 1.5 wt %, greater than 2 wt %, greater than 3 wt %, greater than 4 wt %, greater than 5 wt %, greater than 7 wt %, greater than 10 wt %, greater than 15 wt %, greater than 20 wt %, or greater than 25 wt %. In terms of ranges, the base polyamide composition may comprise caprolactam units in an amount ranging from 1.4 wt % to 50 wt %, e.g., from 1.5 wt % to 45 wt %, from 2 wt % to 43 wt %, from 3 wt % to 40 wt %, from 4 wt % to 35 wt %, from 5 wt % to 30 wt %, from 10 wt % to 30 wt %, or from 10 wt % to 20 wt %. In terms of upper limits, the base polyamide composition may comprise less than 50 wt % caprolactam units, e.g., less than 45 wt %, less than 43 wt %, less than 40 wt %, less than 35 wt %, less than 30 wt %, or less than 20 wt %.

In addition to the non-residual caprolactam units in the nylon mixture, the base polyamide composition also comprises undesirable, low molecular weight components, e.g., residual caprolactam. These low molecular weight compounds form as by-products, or unreacted monomers, of the polymerization reaction, and have detrimental effects on the properties of the final polyamide composition that may result, e.g., after SSP, therefrom. For example, the low-molecular weight compounds may detrimentally affect products, e.g., injection-molded products, by diffusing on the surface thereof, thus forming a greasy film. These diffused low molecular weight compounds may also impair the surface appearance of the products, e.g., reduced gloss and impaired color impression. Still further, the residual caprolactam can detrimentally result in: (1) build up/plate out on process equipment surfaces leading to downtime or reduced production throughput; (2) a non-food contact compliant product according to regulatory specifications, e.g., FDA food contact compliance; and (3) interference with adhesion between film layers, e.g., ethylene vinyl alcohol layers or polyethylene-s-maleic anhydride layers.

In some embodiments, the base polyamide composition comprises greater than 0.6 wt % residual caprolactam, based on the total weight of the base polyamide composition, e.g., greater than 0.7 wt %, greater than 0.75 wt %, greater than 0.8 wt %, greater than 1 wt %, greater than 1.2 wt %, greater than 1.5 wt %, greater than 1.7 wt %, greater than 2 wt %, greater than 2.2 wt %, greater than 2.5 wt %, greater than 2.7 wt %, greater than 3 wt %, or greater than 3.5 wt %. In terms of ranges, the base polyamide composition may comprise residual caprolactam in an amount ranging from 0.6 wt % to 10 wt %, e.g., from 0.7 wt % to 10 wt %, from 0.8 wt % to 9 wt %, from 0.9 wt % to 8.5 wt %, from 1 wt % to 8 wt %, from 1 wt % to 7 wt %, from 1.5 wt % to 5 wt %, from 1.5 wt % to 4 wt %, from 1.5 wt % to 2.5 wt %, or from 1.7 wt % to 2 wt %. In terms of upper limits, the base polyamide composition may comprise less than 10 wt % residual caprolactam, e.g., less than 9 wt %, less than 8.5 wt %, less than 8 wt %, less than 7 wt %, less than 5 wt %, less than 3 wt %, less than 2.5 wt % or less than 2 wt %.

It is noted that the residual caprolactam concentration in the final polyamide composition may be less than the residual caprolactam concentration in the base polyamide composition. Residual caprolactam concentration in the final polyamide composition is discussed in detail below.

In some embodiments, the base polyamide composition has an RV (initially, before processing) less than 55, e.g., less than 53, less than 50, less than 48, less than 45, less than 43, less than 40, less than 38, less than 35, less than 33, less than 30, less than 25, less than 20, or less than 15. In terms of lower limits, the base polyamide composition may have an RV greater than 1, e.g., greater than 3, greater than 5, greater than 8, greater than 10, greater than 12, greater than 15, or greater than 20. In terms of ranges, the base polyamide composition may have an RV ranging from 1 to 55, e.g., from 1 to 50, from 1 to 45, from 3 to 40, from 5 to 38, from 10 to 38, from 10 to 35, from 25 to 40, from 20 to 40, from 30 to 40, from 15 to 40, from 15 to 30, or from 20 to 35. RV, as discussed herein, may be measured by the formic acid method, e.g., ASTM D789 (9.34) (2018), which is well known in the art.

In some embodiments, the base polyamide composition has a number average molecular weight, $M_n$, (initially, before processing) less than 18,000 g/mol, e.g., less than 15,000 g/mol, less than 13,000 g/mol, less than 12,000 g/mol, less than 11,000 g/mol, less than 1,000 g/mol, or less than 8,000 g/mol. In terms of ranges, the base polyamide composition may have a number average molecular weight, $M_n$, ranging from 2,000 g/mol to 18,000 g/mol, e.g., from 4,000 g/mol to 15,000 g/mol, from 5,000 g/mol to 12,000 g/mol, or from 7,000 g/mol to 11,000 g/mol. In terms of lower limits, the base polyamide composition may have a number average molecular weight greater than 2,000 g/mol, e.g., greater than 4,000 g/mol, greater than 5,000 g/mol, greater than 7,000 g/mol, or greater than 9,000 g/mol.

In some embodiments, the base polyamide composition has a melting point ranging from 185° C. to 255° C., e.g., from 205° C. to 255° C., from 185° C. to 240° C., from 190° C. to 230° C., from 195° C. to 215° C., from 200° C. to 210° C., or from 202° C. to 208° C. In terms of upper limits, the base polyamide composition may have a melting point less than 255° C., e.g., less than 240° C., less than 230° C., less than 215° C., less than 210° C., or less than 208° C. In terms of lower limits, the base polyamide composition may have a melting point greater than 185° C., e.g., greater than 190° C., greater than 195° C., greater than 200° C., greater than 202° C., or greater than 205° C.

It has been found that the use of base polyamide compositions having these melting point have a synergistic result when employed in the SSP processes discussed herein. One theory for this is that base polyamide compositions having lower melting points may not be able to reach sufficient temperatures to achieve caprolactam removal. By employing higher melting point base compositions, the ability for caprolactam removal is effectively facilitated. Also, if the melting point of the base polyamide compositions is too low, the composition will melt during SSP, thus rendering the product ineffective.

In some cases, the base polyamide composition is produced by melt polymerizing a polyamide composition and pelletizing the melted polyamide composition to form polyamide pellets.

Process for Producing a Final Polyamide Composition

In conventional processes, undesirable, low molecular weight components, e.g., residual caprolactam, are often removed, e.g., by extraction. Extraction is normally carried out with hot water or with liquids that contain mostly water. From these extraction waters, the residual caprolactam can be recaptured, cleaned, and in some cases, reintroduced as a recycle stream to the polymerization process. These separate steps, however, detrimentally add equipment and operating costs and can add color to the resin. As noted above, an alternative process to water extraction is to remove the residual caprolactam as part of the SSP process, where the caprolactam is volatilized at SSP temperatures and removed from the reactor.

Disclosed herein is a process for producing a polyamides having a low residual caprolactam concentration is disclosed herein. The process comprises the steps of providing the base polyamide composition and processing the base polyamide composition to form the final polyamide composition. The base polyamide composition has an initial residual caprolactam concentration and an initial RV (see discussion above). Likewise, the final polyamide composition has a final residual caprolactam concentration and a final RV.

The processing may be conducted at specific operating parameters that provide for synergistic results when employed with the base polyamide compositions disclosed herein.

In some embodiments, the processing is conducted for a build time less than 40 hours, e.g. less than 38 hours, less than 36 hours, less than 35 hours, less than 34 hours, less than 32 hours, less than 30 hours, less than 28 hours, less than 26 hours, less than 25 hours, less than 24 hours, less than 22 hours, or less than 20 hours. In terms of ranges, the processing may be conducted for a build time ranging from 1 hour to 40 hours, e.g., from 2 hours to 38 hours, from 4 hours to 36 hours, from 5 hours to 35 hours, from 6 hours to 34 hours, from 8 hour to 32 hours, from 10 hours to 30 hours, from 12 hour to 28 hours, from 14 hours to 26 hours, from 16 hour to 25 hours, or from 18 hours to 24 hours. In terms of lower limits, the processing may be conducted for a build time greater than 1 hour, e.g., greater than 2 hours, greater than 4 hours, greater than 6 hours, greater than 8 hours, greater than 10 hours, greater than 12 hours, greater than 14 hours, or greater than 15 hours.

In some embodiments, formulation/process provides for an advantageous RV build rate, which provides sufficient time for beneficial caprolactam removal and final polyamide composition RV. In some embodiments, the RV build rate ranges from 1 to 30 RV units/hour, e.g., from 1 to 27 RV units/hour, from 1 to 25 RV units/hour, from 1 to 22 RV units/hour, from 1.5 to 19 RV units/hour, from 1.5 to 17 RV units/hour, from 1.5 to 15 RV units/hour, from 1 to 12 RV units/hour, from 1.5 to 12 RV units/hour, from 1 to 9 RV units/hour, or from 1.5 to 9 RV units/hour. In terms of upper limits, the RV build rate may be less than 30 RV units/hour, e.g., less than 28 RV units/hour, less than 26 RV units/hour, less than 25 RV units/hour, less than 23 RV units/hour, less than 20 RV units/hour, less than 19 RV units/hour, less than 18 RV units/hour, less than 16 RV units/hour, less than 15 RV units/hour, less than 14 RV units/hour, less than 13 RV units/hour, less than 12 RV units/hour, less than 11 RV units/hour, less than 10 RV units/hour, less than 9 RV units/hour, less than 8 RV units/hour, less than 7 RV units/hour, less than 6 RV units/hour, or less than 5 RV units/hour. In terms of lower limits, the RV build rate may be greater than 0.1 RV units/hour, e.g., greater than 0.3 RV units/hour, greater than 0.3 RV units/hour, greater than 0.5 RV units/hour, greater than 0.7 RV units/hour, greater than 1 RV units/hour, greater than 1.2 RV units/hour, or greater than 1.5 RV units/hour. Of course, these ranges and limits related to only some embodiments. In other embodiments, higher RV build rates are contemplated, e.g., build rates greater than 30 RV units/hour.

In some embodiments, the processing may be conducted at a temperature ranging from 150° C.-250° C., e.g., from 160° C.-230° C., from 165° C.-210° C., from 170° C.-190° C., or from 175° C.-185° C. In terms of upper limits, the processing may be conducted at a temperature less than 250° C., e.g., less than 230° C., less than 210° C., less than 190° C., or less than 185° C. In terms of lower limits, the processing may be conducted at a temperature greater than 150° C., e.g., greater than 160° C., greater than 165° C., greater than 175° C. or greater than 175° C.

In some embodiments, the processing is conducted at a pressure below 1 atm, e.g., below 0.75 atm, below 0.5 atm, below 0.25 atm, or below 0.1 atm. In one embodiment, the processing is conducted at a pressure less than atmospheric pressure.

In a particular embodiment, the temperature, pressure, and build time are synergistically used together. For example, the processing may be conducted at temperature ranging from 150° C. — 250° C., a build time less than 30 hours, and a pressure less than atmospheric pressure. In some cases, the entire process time (the "recipe time") may range from 15 hours to 35 hours, e.g., from 5 hours to 30 hours, from 18 hours to 24 hours, or from 20 hours to 22 hours. Each of these factors may impact the RV and the residual caprolactam concentration of the final polyamide composition, and can be adjusted and/or balanced to achieve desired results.

The components of the base polyamide composition provide for these particular build times, which allow for both sufficient caprolactam removal and sufficient RV and/or molecular weight build. Conventional base polyamide compositions have been unable to achieve this combination.

The processing step may vary widely. In some cases, the processing step comprises SSP, and in such cases the SSP may comprise heating the base polyamide. In these instances, the SSP may be conducted at a temperature ranging from 170° C.-190° C., e.g., from 175° C.-190° C., from 175° C.-188° C., from 180° C.-190° C., or from 182° C.-188° C. In terms of upper limits, the processing may be conducted at a temperature less than 190° C., e.g., less than 188° C., less than 185° C., or less than 182° C. In terms of lower limits, the processing may be conducted at a temperature greater than 170° C., e.g., greater than 175° C., greater than 180° C., or greater than 182° C.

In other embodiments, the processing step comprises and extrusion RV build, e.g., using twin screw extrusion. The processing is not limited to these exemplary options, however. Other examples include extraction and/or leaching. These steps may be carried out under low pressure or under vacuum.

Advantageously, the removal of residual caprolactam via SSP has been found to retard the propensity for plate-out of the residual caprolactam monomer on metal surfaces. Plate-out typically occurs when the residual caprolactam monomer volatilizes from the polymer melt at high processing temperatures and then condenses on metal surfaces of the processing equipment. This plate-out, generates harmful flaws and defects in the films and/or other end products. The reduction or elimination of residual caprolactam in the polyamide beneficially leads to reduction or elimination of plate-out. The processes also beneficially produce polyamides that comply with FDA regulation (21 CFR 177.1500 (b) (4.1)), which requires low amounts of residual caprolactam for food contact applications. Additionally, SSP prevents residual caprolactam from blooming to the film surface which can cause various problems such as reduced adhesion with other polymer film layers, e.g., maleated polyethylene, poly(ethylene vinyl alcohol), and creates haze which limits film clarity.

In some embodiments, the processing step increases the initial RV of the base polyamide composition and/or decreases the initial residual caprolactam concentration of the base polyamide composition. In some cases, the final RV is at least 10% greater than the initial RV, e.g., at least 15% greater, at least 20% greater, at least 25% greater, at least 30% greater at least 35% greater, at least 40% greater, at least 50% greater, at least 60% greater, at least 75% greater, at least 90% greater, or at least 100% greater.

In some embodiments, the final caprolactam concentration is at least 5% less than the initial caprolactam concentration, e.g., at least 10% less, at least 15% less, at least 20% less, at least 25% less at least 35% less, at least 45% less, at least 50% less, at least 60% less, at least 75% less, at least 90% less, or at least 100% less.

In some embodiments, the final polyamide composition comprises less than 0.75 wt % residual caprolactam, based on the total weight of the final polyamide composition, e.g., less than 0.70 wt %, less than 0.65 wt %, less than 0.6 wt %, less than 0.55 wt %, less than 0.5 wt %, less than 0.45 wt %, less than 0.4 wt %, less than 0.35 wt %, less than 0.3 wt %, less than 0.25 wt %, or less than 0.2 wt %. In terms of ranges, the final polyamide composition may comprise residual caprolactam in an amount ranging from 0.01 wt % to 0.7 wt %, e.g., from 0.05 wt % to 0.7 wt %, from 0.1 wt % to 0.6 wt %, from 0.2 wt % to 0.6 wt %, from 0.2 wt % to 0.5 wt %, from 0.2 wt % to 0.4 wt %, or from 0.25 wt % to 0.35 wt %. In terms of upper limits, the final polyamide composition may comprise greater than 0.01 wt % residual caprolactam, e.g., greater than 0.05 wt %, greater than 0.1 wt %, greater than 0.15 wt %, greater than 0.2 wt %, greater than 0.25 wt %, greater than 0.3 wt %, or greater than 0.4 wt %. In some aspects, the high molecular weight polyamide solution comprises substantially no (residual) caprolactam, e.g., no (residual) caprolactam.

In some embodiments, the final polyamide composition has an RV (after processing) ranging from 40 to 350, e.g., from 45 to 300, from 50 to 250, from 55 to 215, from 55 to 200, from 50 to 200, from 55 to 190, from 70 to 175, from 120 to 180, from 130 to 170, from 140 to 160, from 75 to 160, from 80 to 100, from 85 to 140, from 90 to 135, from 85 to 95, or from 100 to 130. In terms of lower limits, the final polyamide composition may have an RV greater than 40, e.g., greater than 45, greater than 50, greater than 55, greater than 60, greater than 65, greater than 70, greater than 75, greater than 80, greater than 90, greater than 95, greater than 100, greater than 110, greater than 120, or greater than 130. In terms of upper limits, the final polyamide composition may have an RV less than 350, e.g., less than 300, less than 250, less than 300, less than 250, less than 200, less than 190, less than 175, less than 170, less than 160, less than 140, less than 135, less than 130, less than 120, less than 110, less than 100, less than 90.

As noted herein, the combination of the disclosed base polyamide composition and processing step provides for surprising benefits relating to pellet quality. In one embodiment, the final polyamide composition has a color index ranging from −6.0 to 5.0, as measured by ASTM E313 (2018), e.g., from −5.5 to 4.5, from −5.0 to 4.0, from −4.5 to 3.5, from −4.0 to 3.0, from −3.5 to 2.5, from −3.0 to 2.0, from −2.5 to 1.5, from −2.0 to 1.0, from −1.5 to 0.5, or from −1.0 to 0. In terms of upper limits, the final polyamide composition may have a color index less than 5.0, e.g., less than 5.5, less than 5.0, less than 5.5, less than 5.0, less than 4.5, less than 4.0, less than 3.5, less than 3.0, less than 2.5, less than 2.0, less than 1.5, less than 1.0, less than 0.5, or less than 0. In terms of lower limits, the final polyamide composition may have a color index greater than −6.0, e.g., greater than −5.5, greater than −5.5, greater than −5.0, greater than −4.5, greater than −4.0, greater than −3.5, greater than −3.0, greater than −2.5, greater than −2.0, greater than −1.5, greater than −1.0, greater than −0.5, or greater than 0.

Figure 4:
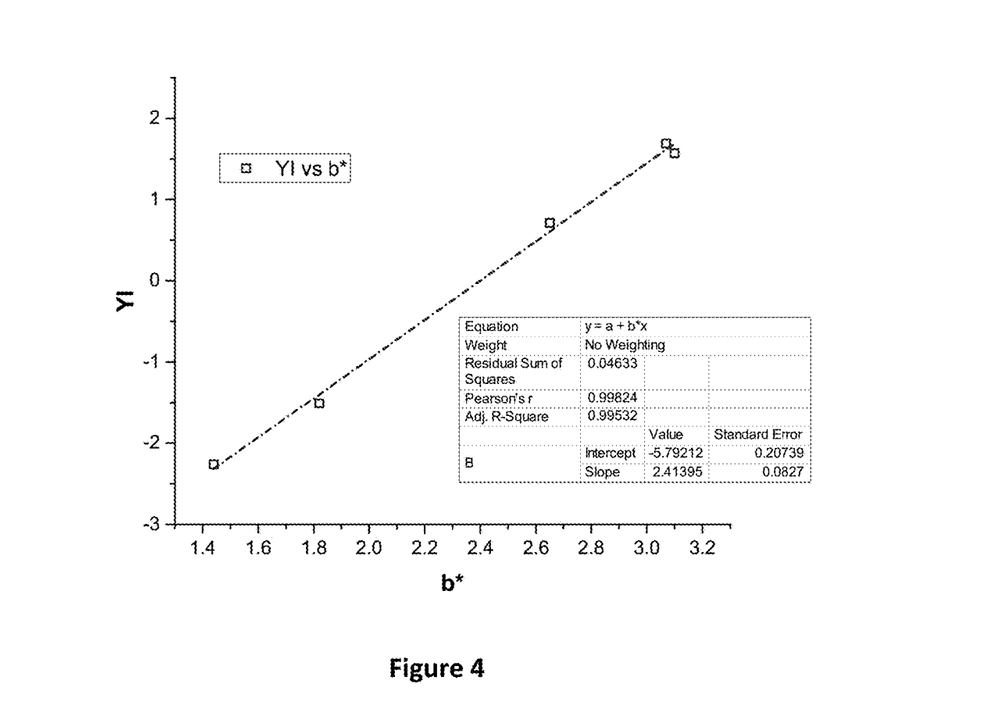
FIG. 4 is a plot showing demonstrating the BYK Gardner unit's correlation.

In some cases, color index, e.g., yellowness index, is calculated according to ASTM E313 employing a spectrophotometer (an example brand is BYK Gardner). The yellowness index is an indicator of the whiteness or yellowness of an analyzed material; the lower the number relates to a whiter or less yellow material. In some cases, yellowness index values may be calculated using an adjustment factor, so in some cases, it may be more useful to compare data on a b* basis, which depicts the yellowness or blueness of a sample. Lower or negative values correspond to blue or whitish pellets that have an absence of a yellow hue. FIG. 4 is a graph that show demonstrates the BYK Gardner unit's correlation between YI and b*.

In some cases, the disclosed formulation and/or the SSP process contribute to the final polyamide composition having a consistent size, e.g., a high degree of pellet size uniformity, which may be expressed as weight per pellets (or per 100 pellets). Without being bound by theory, it is believed that the use of the disclosed parameters, e.g., RV ranges/limits, contributes to the elimination of bubbles from the molten polyamide strands, which results in less disruption in strand and diameter consistency. For example, the final polyamide composition may have a pellet weight ranging from 0.50 grams/100 pellets to 1.4 grams/100 pellets, e.g., from 0.55 grams/100 pellets to 1.35 grams/100 pellets, from 0.60 grams/100 pellets to 1.30 grams/100 pellets, from 0.65 grams/100 pellets to 1.25 grams/100 pellets, from 0.70 grams/100 pellets to 1.20 grams/100 pellets, from 0.75 grams/100 pellets to 1.15 grams/100 pellets, or from 0.80 grams/100 pellets to 1.10 grams/100 pellets. In terms of upper limits, the final polyamide composition may have a pellet weight less than 1.4 grams/100 pellets, e.g., less than 1.35 grams/100 pellets, less than 1.30 grams/100 pellets, less than 1.25 grams/100 pellets, less than 1.20 grams/100 pellets, less than 1.15 grams/100 pellets, or less than 1.10 grams/100 pellets. In terms of lower limits, the final polyamide composition may have a pellet weight greater than 0.50 grams/100 pellets, e.g., greater than 0.55 grams/100 pellets, greater than 0.60 grams/100 pellets, greater than 0.65 grams/100 pellets, greater than 0.70 grams/100 pellets, greater than 0.75 grams/100 pellets, or greater than 0.80 grams/100 pellets. In some cases, the final polyamide composition may have a pellet weight that varies by only +/−25%, based on the average or target pellet weight, e.g., +/−20%, +/−15%, +/−10%, +/−5%, or +/−2%.

In some cases, the improved color quality advantageously allows for the reduction or elimination of tinting agent(s) in the final polyamide composition. For example, the final polyamide composition comprises little or no tinting agent(s). In one embodiment, the final polyamide compositions comprise from 0 wt % to 10 wt % tinting agent, based on the total weight of the final polyamide composition, e.g., from 0.0001 wt % to 10 wt %, from 0.001 to 10 wt %, from 0.005 wt % to 0.5 wt %, from 0.05 to 0.5 wt %, from 0.05 to 0.5 wt %, or from 0.005 to 0.1 wt %. In terms of upper limits, the final polyamide compositions comprise less than 10 wt % tinting agent, e.g., less than 9 wt %, less than 8 wt % less than 7 wt %, less than 6 wt %, less than 5 wt %, less than 4 wt %, less than 3 wt %, less than 2 wt %, less than 1 wt %, less than 0.5 wt %, less than 0.1 wt %, or less than 0.05 wt %. In terms of lower limits, the final polyamide compositions comprise greater than 0.0001 wt % tinting agent, e.g., greater than 0.005 wt %, greater than 0.001 wt %, greater than 0.05 wt %, greater than 0.01 wt %, or greater than 0.1 wt %. These ranges and limits are applicable to the base polyamide composition as well.

In one specific embodiment, the disclosed base polyamide composition and process provide are utilized. The base polyamide composition comprises from 0.1 wppm to 30 wppm catalyst composition, from 1 wt % to 8 wt % residual caprolactam and has a delta end group level ranging from 50 µeq/gram to 75 µeq/gram and has an initial RV less than 35. The final polyamide composition comprises less than 0.5 wt % residual caprolactam and has a final RV greater than 45.

In another specific embodiment, the disclosed base polyamide composition and process provide are utilized. The base polyamide composition comprises from 1 wppm to 15 wppm phosphorus, greater than 1.5 wt % residual caprolactam and has a delta end group level greater than 50 µeq/gram and has an initial RV less than 33. The processing is conducted at a pressure less than atmospheric pressure and a temperature ranging from 175° C. to 185° C. The final polyamide composition comprises less than 0.4 wt % residual caprolactam and has a final RV greater than 75.

Films and Other Applications

As noted above, one specific application for the disclosed polyamide compositions is in films, e.g., films for food-related applications. Also disclosed herein is a film formed from the final polyamide composition. Film production processes are well known, and the process for forming the film from the final polyamide composition may vary widely.

In other cases, the disclosed polyamide compositions may be particularly useful for molding-related applications. Other exemplary applications include extruded profiles, fiber, blow molding, and/or other applications that require low caprolactam concentration.

The films have surprising performance characteristics. For example, the films may demonstrate a puncture resistance greater 3 J/mm, as measured via ASTM F1366 (2018), e.g., greater than 4 J/mm, greater than 5 J/mm, greater than 7 J/mm, greater than 10 J/mm, or greater than 15 J/mm. In terms of ranges, the films may demonstrate a puncture resistance ranging from 3 J/mm to 50 J/mm, e.g., from 3 J/mm to 25 J/mm, from 5 J/mm to 50 J/mm, from 5 J/mm to 25 J/mm, from 5 J/mm to 20 J/mm, or 10 J/mm to 25 J/mm.

In some embodiments, the films may demonstrate an impact resistance greater than 1500 grams, as measured via ASTM D1709 A (2018), e.g., greater than 1700 grams, greater than 2000 grams, greater than 2200 grams, greater than 2500 grams, greater than 3000 grams or greater than 5000 grams. In terms of ranges, the films may demonstrate an impact resistance ranging from 1500 grams to 20000 grams, e.g., from 1700 grams to 15000 grams, from 2000 grams to 15000 grams, from 2000 grams to 10000 grams, from 2500 grams to 10000 grams, or from 3000 grams to 10000 grams.

In some embodiments, the films may demonstrate a tear resistance greater than 50 grams, as measured via ASTM D1922 (2018), e.g., greater than 60 grams, greater than 70 grams, greater than 80 grams, greater than 90 grams, greater than 100 grams, greater than 125 grams, or greater than 150 grams. In terms of ranges, the films may demonstrate tear resistance ranging from 50 grams to 500 grams, e.g., from 60 grams to 450 grams, from 70 grams to 400 grams, from 80 grams to 300 grams, from 80 grams to 200 grams, or from 90 grams to 150 grams.

Unexpectedly, the inventors have discovered that higher (positive) levels of DEG in the final polyamide composition contributes films having better adhesion between layers, when utilized in multi-layer film applications. In particular, it has been found that that these films have improved bonding strength with tie layers, e.g., maleic anhydride-based tie layers, of multi-layer film applications. This improvement in bonding has been shown to contribute to improved properties, e.g., puncture resistance, impact resistance, and/or tear resistance, in the multi-layer film structures, as noted above. Without being bound by theory, it is postulated that the increased level amine ends (as reflected in higher DEG level) surprisingly improves adhesion between other layers, e.g., polyethylene, polyethylene terephthalate, and/or other polyamide layers. The amine ends allow more/better bonds to form with maleic anhydride-based tie layers, which results in significant improvements in lamination, e.g., reduction or elimination of delamination.

The final polyamide composition, in some embodiments, has a DEG level greater than 20 µeq/gram, e.g., greater than 22 µeq/gram, greater than 25 µeq/gram, greater than 27 µeq/gram, greater than 30 µeq/gram, greater than 32 µeq/gram, greater than 35 µeq/gram, greater than 40 µeq/gram, greater than 45 µeq/gram, greater than 50 µeq/gram, or greater than 55 µeq/gram.

In terms of ranges, the final polyamide composition may have a DEG ranging from 5 µeq/gram to 125 µeq/gram, e.g., from 10 µeq/gram to 120 µeq/gram, from 15 µeq/gram to 115 µeq/gram, from 20 µeq/gram to 110 µeq/gram, from 25 µeq/gram to 100 µeq/gram, from 30 µeq/gram to 90 µeq/gram, from 35 µeq/gram to 85 µeq/gram, or from 40 µeq/gram to 80 µeq/gram. In terms of upper limits, the base polyamide composition may have a DEG level less than 125 µeq/gram, e.g. less than 120 µeq/gram, less than 115 µeq/gram, less than 110 µeq/gram, less than 100 µeq/gram, less than 90 µeq/gram, less than 80 µeq/gram, less than 70 µeq/gram, less than 68 µeq/gram, less than 65 µeq/gram, less than 63 µeq/gram, less than 60 µeq/gram, less than 58 µeq/gram, less than 55 µeq/gram, less than 53 µeq/gram, or less than 50 µeq/gram.

Tunable Aspects

The present disclosure is directed, in part, to a tunable method for making final polyamide compositions, and for controlling final caprolactam concentrations and/or final RVs of the final polyamide compositions. The final polyamide compositions may be "tuned" by adjusting a variety of conditions during the processing step and/or by adjusting the make-up of the base polyamide composition so as to achieve one or more desirable properties. In some aspects, the residual caprolactam concentration and/or RV of the final polyamide composition (as well as other characteristics thereof) may be controlled to be within the ranges and limits discussed above.

Process conditions and/or compositional features that may be adjusted during the processing include, for example, DEG level (end group balance), catalyst content, temperature, pressure moisture content, and the presence of the catalyst. By adjusting at least one of these conditions, the desired properties of the final polyamide composition can be controlled, e.g., tuned. The inventors have discovered that the characteristics of the precursor polyamide can be adjusted by utilizing particular parameters such that a desirable end product can be achieved. These specific relationships between base polyamide composition, operating conditions, and final polyamide composition have not yet been sufficiently explored and/or disclosed in the existing references.

In one embodiment, disclosed herein is a process for controlling the relative viscosity of a final polyamide composition. The process comprises the step of providing a base polyamide composition having a low relative viscosity, e.g., less than 40. The process further comprises that steps of determining a desired relative viscosity for the final polyamide composition and selecting at least one processing condition from catalyst content, DEG level, temperature, pressure, and moisture content. The process further comprises the "tunable" step of processing the base polyamide composition under the at least one processing condition and based on the desired relative viscosity to form the final polyamide composition having a final relative viscosity ranging from 55 to 200, e.g., from 75 to 200.

In one embodiment, disclosed herein is a process for controlling the caprolactam content of a final polyamide composition. The process comprises the step of providing a base polyamide composition having residual caprolactam content greater than 0.75 wt %. The process further comprises the steps of determining a desired residual caprolactam content for the final polyamide composition and selecting at least one processing condition from catalyst content, DEG level, temperature, pressure, and moisture content. The process further comprises the "tunable" step of processing the base polyamide composition under the at least one condition and based on the desired residual caprolactam content to form the final polyamide composition having a residual caprolactam content less than 0.4 wt %.

In one embodiment, disclosed herein is a process for manufacturing a final polyamide composition. The process comprises the step of providing a base polyamide composition having one or more initial properties comprising initial caprolactam content, initial relative viscosity, and initial color index. The process further comprises the step of determining one or more desired final properties for the final polyamide composition product, the properties comprising final caprolactam content, final relative viscosity, and color index. The process further comprises the "tunable" step of processing the base polyamide composition under one or more process conditions comprising catalyst content, delta end group level, temperature, pressure, and moisture content and based on the desired final property to provide the final polyamide composition.

EXAMPLES

Base polyamide compositions were prepared by polymerizing a salt solution of HMD and adipic acid, and a desired amount of caprolactam to tune polymer melting point as well as other properties, e.g., as shown below in Table 1. The copolyamide comprised repeating 1:1 adipic acid-hexamethylene diamine units (PA-6,6) combined with repeating units from lactams such as caprolactam (PA-6). A phosphorous-containing catalyst was added prior to the initial polymerization step. Close attention was paid to the level of the catalyst in order to control RV build rate and desired targets of RV and residual caprolactam.

Similarly, DEG level was controlled by controlling the amount of excess hexamethylene diamine added to the polymerization solution. In the case of no HMD excess, the copolyamides typically come out with a DEG (as defined above) around −30, and this is a result of the high volatility of HMD versus adipic acid. In order to produce high DEG copolyamides with excess amines, HMD can be spiked in some excess to the polymerization solution. As one example, to target a DEG=45 µeq/gram, the HMD spike level can be approximately 38 µeq/gram.

The copolyamide was then polymerized by (a) heating the blend with stirring; (b) holding the blend under a suitable pressure and temperature with removal of water vapor; followed by (c) decompression and holding at a temperature above the melting point of the blend.

At the end of the polymerization process, the polymer was cooled with water and extruded in the form of rods. These rods were subsequently cut in order to produce pellets.

The resultant base polyamide composition pellets were processed via SSP to build RV and to reduce residual caprolactam concentration, yielding final polyamide compositions. The SSP was conducted under an inert atmosphere, elevated temperatures, and under reduced pressure. Reduced pressures were achieved through the use of vacuum pumps. The compositions of the base and final polyamide compositions were measured. The results at various build times are presented in Table 1.

TABLE 1

Working and Comparative Example Compositions

| | DEG | Catalyst (Phosphorus), ppm | Build Time, hr | SSP Temp. ° C. | Final RV | Final Capro, wt % |
|---|---|---|---|---|---|---|
| Ex. | | | | | | |
| 1 | 45 | 11 | 8 | 176.5 | 56 | 0.54 |
| 2 | 45 | 11 | 10 | 177 | 74.6 | 0.39 |
| 3 | 45 | 11 | 12 | 177 | 102 | 0.29 |
| 4 | 45 | 11 | 14 | 177.5 | 132 | 0.24 |
| 5 | 45 | 11 | 16 | 178 | 155.3 | 0.21 |
| 6 | 45 | 11 | 18 | 177 | 181 | 0.17 |
| 7 | 45 | 11 | 20 | 177.5 | 202 | 0.16 |
| 8 | 45 | 11 | 21 | 178 | 210 | 0.14 |
| 9 | 52 | 7 | 14 | 180 | 62.2 | 0.54 |
| 10 | 52 | 7 | 16.5 | 180 | 85.8 | 0.43 |
| 11 | 52 | 7 | 18.5 | 180 | 105 | 0.3 |
| 12 | 52 | 7 | 20.5 | 180 | 125 | 0.25 |
| 13 | 52 | 7 | 22.5 | 180 | 138 | 0.21 |
| 14 | 52 | 7 | 24.5 | 180 | 160 | 0.16 |
| 15 | 67 | 30 | 3 | 180 | 84.7 | 0.74 |
| 16 | 67 | 30 | 4 | 180 | 93.3 | 0.73 |
| 17 | 67 | 30 | 6 | 180 | 107.2 | 0.58 |
| 18 | 67 | 30 | 24 | 180 | 159.6 | 0.14 |
| Comparative Ex. | | | | | | |
| A | −30 | 150 | 4 | 105 | 50.58 | 1.74 |
| B | −30 | 150 | 5 | 120 | 51.39 | 1.72 |
| C | −30 | 150 | 6 | 134 | 52.41 | 1.67 |
| D | −30 | 150 | 7 | 140 | 54.55 | 1.57 |
| E | −30 | 150 | 8 | 145 | 58.21 | 1.56 |
| F | −30 | 150 | 9 | 151 | 65.43 | 1.54 |
| G | −30 | 150 | 10 | 152 | 75.24 | 1.48 |
| H | −30 | 150 | 11 | 157 | 90.15 | 1.43 |
| I | −30 | 150 | 13 | 160 | 138.8 | 1.33 |

Figure 1:
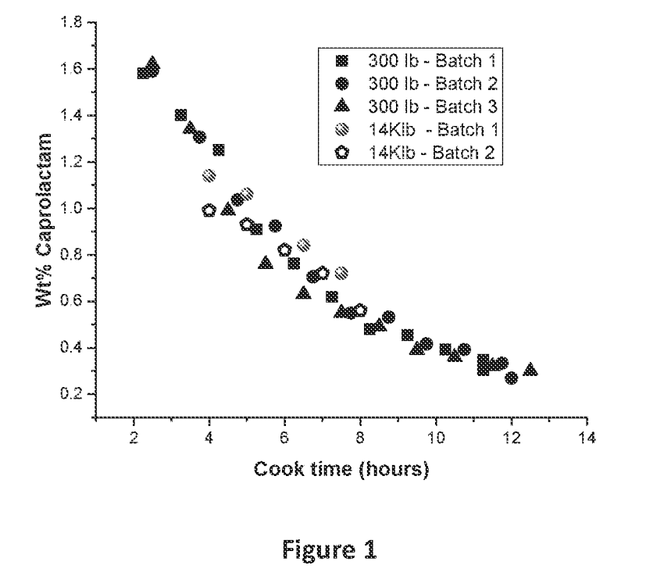
FIG. 1 is a graph showing residual caprolactam concentration in final polyamide compositions at various build times.
Figure 2:
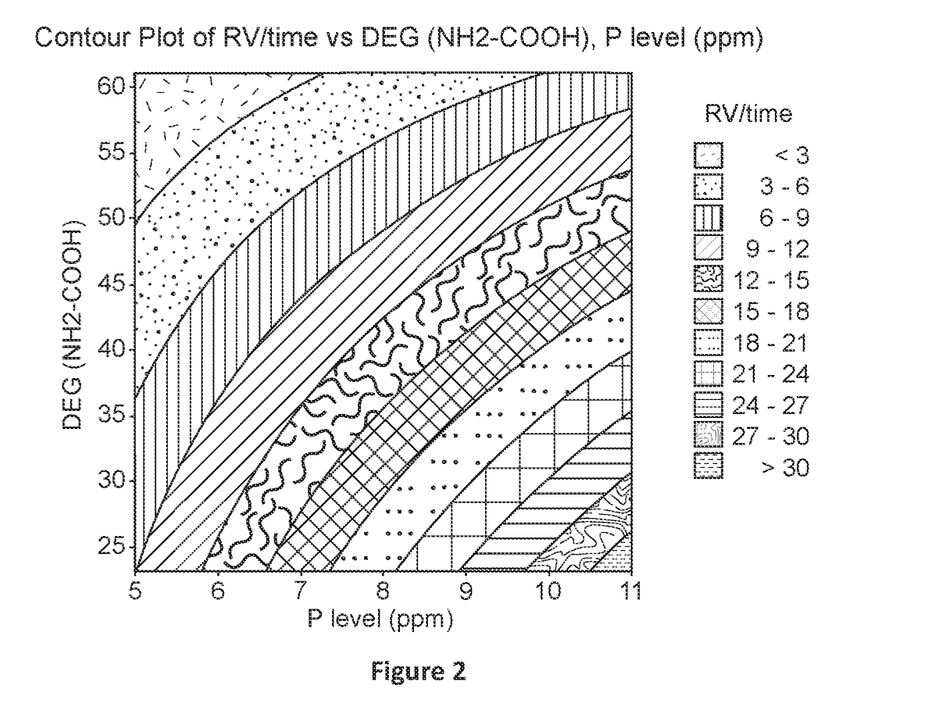
FIG. 2 is a contour plot showing desirable DEG and catalyst (phosphorus) concentration in base polyamide compositions.
Figure 3:
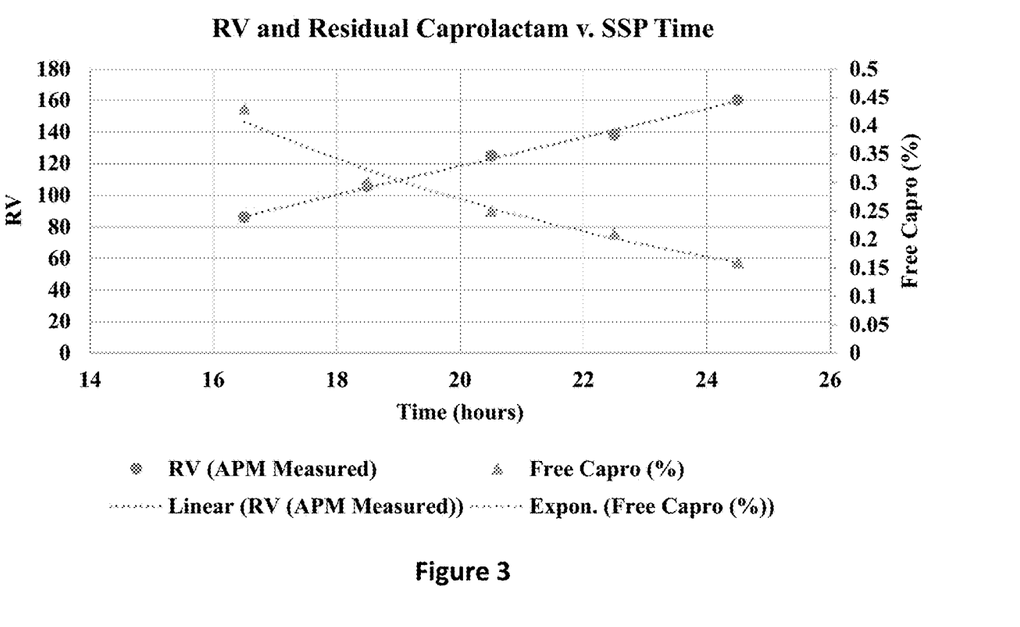
FIG. 3 is a plot showing desirable final RV and residual caprolactam in the base polyamide compositions of Examples 9-14.

As shown in Table 1 and FIGS. 1-3, when base compositions comprised specific DEGs and catalyst concentrations within particular ranges and catalyst concentration, significantly less residual caprolactam was present after processing (SSP), even at lesser build times. By employing specific DEG levels and catalyst (phosphorus) concentrations, desirable RV build rates are achieved, which result in superior combinations of residual caprolactam concentration, e.g., less than 0.75, and RV, e.g., greater than 40.

For example, Examples 1-8 utilized a DEG level of 45 and a catalyst concentration of 11 ppm. From a build time as low as 8 hours, the compositions demonstrated low residual caprolactam levels and desirable RVs. From 8 hours to 21 hours, residual caprolactam ranged from 0.14 to 0.54 and RV ranged from 56 to 210. Examples 9-14 utilized a DEG level of 52 and a catalyst concentration of 7 ppm. From build times of at least 14 hours, residual caprolactam ranged from 0.16 to 0.54 and RV ranged from 62 to 160. Examples 15-18 utilized a DEG level of 67 and a catalyst concentration of 30 ppm. From build times of at least 6 hours, residual caprolactam ranged from 0.14 to 0.58 and RV ranged from 107.2 to 159.6.

FIG. 2 is a contour plot showing DEG levels and catalyst (phosphorus) concentration in base polyamide compositions. As shown, by employing specific DEG levels and catalyst (phosphorus) concentrations, desirable RV build rates are achieved, which result in superior combinations of residual caprolactam concentration and RV. In particularly advantageous examples, e.g., the top 6 contour bands, RV build rates less than 20 RV units/hour were demonstrated, which resulted in low levels of caprolactam, e.g., significantly less than 0.6 wt %. In addition, these examples resulted in beneficial final RVs ranging from 55 to 215.

In contrast, when lower DEG levels, e.g., less than 30 μeq/gram, are utilized, rapid RV build rates were demonstrated. These rapid build rates do not allow sufficient time for caprolactam removal. Thus, the final polyamide composition contained high levels of caprolactam, e.g., significantly greater than 1 wt %.

FIG. 3 is a plot showing RV and residual caprolactam of Examples 9-14 during solid state polymerization. As shown, employing specific DEG levels and catalyst (phosphorus) concentrations resulted in superior combinations of residual caprolactam concentration and RV, even at longer polymerization times, e.g., 24.5 hours. In particular, after polymerization for 16.5 hours, the final RV was 85.8 and the residual caprolactam was 0.54 wt %. Surprisingly, after 8 more hours of polymerization, the RV build rate was controlled such that the final RV was 160 and the final caprolactam was significantly less than 0.6 wt %.

The following embodiments are disclosed:

Embodiment 1: A process for producing a polyamide composition having a low residual caprolactam concentration, the process comprising the steps of: (a) providing a base polyamide composition comprising: a nylon mixture having caprolactam units; from 1 wppb to 50 wppm of a catalyst composition; and residual caprolactam, and having an initial residual caprolactam concentration and an initial relative viscosity; (b) processing the base polyamide composition to form the final polyamide composition having a final residual caprolactam concentration and a final relative viscosity.

Embodiment 2: An embodiment of embodiment 1, wherein the base polyamide composition has a delta end group level ranging from 30 μeq/gram to 90 μeq/gram.

Embodiment 3: An embodiment of embodiment 1 or 2, wherein the initial residual caprolactam concentration is greater than 0.75 wt %, based on the total weight of the base polyamide composition.

Embodiment 4: An embodiment of any of embodiments 1-3, wherein the final residual caprolactam concentration is less than 0.75 wt %, based on the total weight of the final polyamide composition.

Embodiment 5: An embodiment of any of embodiments 1-4, wherein the final relative viscosity ranges from 40 to 350.

Embodiment 6: An embodiment of any of embodiments 1-5, wherein the final polyamide composition has a color index ranging from −6 to 5, as measured by ASTM E313 (2018).

Embodiment 7: An embodiment of any of embodiments 1-6, wherein the final relative viscosity is greater than the initial relative viscosity.

Embodiment 8: An embodiment of any of embodiments 1-7, wherein the final relative viscosity is at least 10% greater than the initial relative viscosity and the final residual caprolactam concentration is at least 5% less than the initial residual caprolactam concentration.

Embodiment 9: An embodiment of any of embodiments 1-8, wherein, during processing, the initial relative viscosity increases at a build rate that is substantially linear, wherein the RV build rate ranges from 1 to 30 RV units/hour.

Embodiment 10: An embodiment of any of embodiments 1-9, wherein the base polyamide composition has a melting point ranging from 180° C. to 255° C.

Embodiment 11: An embodiment of any of embodiments 1-10, wherein the nylon mixture of the base polyamide composition comprises: from 1 wt % to 80 wt % nylon-6; and from 20 wt % to 99 wt % nylon-6/6.

Embodiment 12: An embodiment of any of embodiments 1-11, wherein processing comprises solid state polymerization, which comprises heating the base polyamide.

Embodiment 13: An embodiment of any of embodiments 1-12, wherein the processing is conducted for a build time ranging from 1 hour to 30 hours, and a temperature ranging from 170° C.-190° C.

Embodiment 14: An embodiment of any of embodiments 1-13, wherein the base polyamide composition is produced by melt polymerizing a polyamide composition and pelletizing the melted polyamide composition to form polyamide pellets.

Embodiment 15: An embodiment of any of embodiments 1-14, wherein the catalyst composition comprises phosphorous acid; phosphonic acid; alkyl- and aryl-substituted phosphonic acids; 2-pyridylethyl phosphonic acid; hypophosphorous acid; alkyl-, aryl- and alkyl-/aryl-substituted phosphinic acids; phosphoric acid; esters and salts of these phosphorous-containing acids; manganese hypophosphite; sodium hypophosphite; benzene phosphinic acid; monosodium phosphate; or any combinations thereof.

Embodiment 16: An embodiment of any of embodiments 1-15, wherein processing is conducted at a temperature ranging from 150° C. to 250° C.

Embodiment 17: An embodiment of any of embodiments 1-16, wherein processing is conducted at a pressure less than atmospheric pressure.

Embodiment 18: An embodiment of any of embodiments 1-17, wherein the final polyamide composition comprises less than 10 wt % tinting agent and/or the base polyamide composition comprises less than 10 wt % tinting agent.

Embodiment 19: An embodiment of any of embodiments 1-18, wherein the base polyamide composition comprises from 0.1 wppm to 30 wppm catalyst composition, from 1 wt % to 8 wt % residual caprolactam and has a delta end group level ranging from 50 μeq/gram to 75 μeq/gram and has initial relative viscosity less than 35 and wherein the final polyamide composition comprises less than 0.5 wt % residual caprolactam and has a final relative viscosity greater than 45.

Embodiment 20: An embodiment of any of embodiments 1-19, wherein the base polyamide composition comprises from 1 wppb to 35 wppm phosphorus, greater than 1.5 wt % residual caprolactam and has a delta end group level greater than 50 μeq/gram and has initial relative viscosity less than 33 and wherein the processing is conducted at a pressure less than atmospheric pressure and a temperature ranging from 175° C. to 185° C., and wherein the final polyamide composition comprises less than 0.4 wt % residual caprolactam and has a final relative viscosity greater than 55, e.g., greater than 75.

Embodiment 21: A base polyamide composition comprising: a nylon mixture having caprolactam units; from 1 wppb to 50 wppm catalyst composition; and greater than 0.75 wt % residual caprolactam; wherein the base polyamide composition has a delta end group level ranging from 30 µeq/gram to 90 µeq/gram.

Embodiment 22: An embodiment of embodiment 21, wherein the base polyamide composition has a delta end group level greater than 50 µeq/gram.

Embodiment 23: An embodiment of any of embodiments 21 and 22, wherein the base polyamide comprises greater than 1.4 wt % caprolactam units, based on the total weight of the base polyamide composition.

Embodiment 24: An embodiment of any of embodiments 21-23, wherein the base polyamide has a relative viscosity less than 55.

Embodiment 25: An embodiment of any of embodiments 21-24, wherein the base polyamide has a melting point ranging from 185° C. to 255° C.

Embodiment 26: An embodiment of any of embodiments 21-25, wherein the nylon mixture of the base polyamide composition comprises: from 1 wt % to 50 wt % nylon-6; and from 20 wt % to 99 wt % nylon-6/6.

Embodiment 27: An embodiment of any of embodiments 21-26, wherein the catalyst composition comprises phosphorous acid; phosphonic acid; alkyl- and aryl-substituted phosphonic acids; 2-pyridylethyl phosphonic acid; hypophosphorous acid; alkyl-, aryl- and alkyl-/aryl-substituted phosphinic acids; phosphoric acid; esters and salts of these phosphorous-containing acids; manganese hypophosphite; sodium hypophosphite; benzene phosphinic acid; monosodium phosphate; or any combinations thereof.

Embodiment 28: A process for producing a polyamides having a low residual caprolactam concentration, the process comprising the steps of: (a) providing a base polyamide composition comprising: a nylon mixture having caprolactam units; from 1 wppb to 50 wppm catalyst composition; and at least 0.75 wt % residual caprolactam; and having a delta end group level greater than 50 µeq/gram, an initial caprolactam concentration, and an initial relative viscosity; (b) processing the base polyamide composition to form a final polyamide composition having a final caprolactam concentration and a final relative viscosity.

Embodiment 29: A film formed from a final polyamide composition comprising: polyamide monomers; less than 0.75 wt % residual caprolactam, wherein the final polyamide composition has a delta end group level ranging from 30 µeq/gram to 90 µeq/gram and a melting point ranging from 205° C. to 255° C.

Embodiment 30: An embodiment of embodiment 29, wherein the film demonstrates: a puncture resistance greater than 3 J/mm as measured via ASTM F1366 (2018), an impact resistance greater than 1500 grams as measured via ASTM D1709. A (2018), and/or a tear resistance greater than 50 grams as measured via ASTM D1922 (2018).

Embodiment 31: A process for controlling the relative viscosity of a final polyamide composition, the process comprising: (a) providing a base polyamide composition having relative viscosity less than 40; (b) determining a desired relative viscosity for the final polyamide composition; (c) selecting at least one processing condition from catalyst content, delta end group level, temperature, pressure, and moisture content; and (d) processing the base polyamide composition under the at least one processing condition and based on the desired relative viscosity to form the final polyamide composition having a final relative viscosity ranging from 55 to 200, e.g., from 75 to 200.

Embodiment 32: A process for controlling the caprolactam content of a final polyamide composition, the process comprising: (a) providing a base polyamide composition having residual caprolactam content greater than 0.6 wt %; (b) determining a desired residual caprolactam content for the final polyamide composition; (c) selecting at least one processing condition from catalyst content, delta end group level, temperature, pressure, and moisture content; and (d) processing the base polyamide composition under the at least one condition and based on the desired residual caprolactam content to form the final polyamide composition having a residual caprolactam content less than 0.4 wt %.

Embodiment 33: A process for manufacturing a final polyamide composition, the process comprising: (a) providing a base polyamide composition having one or more initial properties comprising initial caprolactam content, initial relative viscosity, and initial color index; (b) determining one or more desired final properties for the final polyamide composition product, the properties comprising final caprolactam content, final relative viscosity, and color index; (c) processing the base polyamide composition under one or more process conditions comprising catalyst content, delta end group level, temperature, pressure, and moisture content and based on the desired final property to provide the final polyamide composition.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference. In addition, it should be understood that aspects of the invention and portions of various embodiments and various features recited herein and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit the invention.

We claim:

1. A base polyamide composition comprising:

a nylon mixture having caprolactam units;

from 1 wppb to 50 wppm catalyst composition; and greater than 0.75 wt % residual caprolactam, based on the total weight of the base polyamide composition;

wherein the base polyamide composition has a delta end group level ranging from 30 µeq/gram to 90 µeq/gram.

2. The base polyamide composition of claim 1, wherein the base polyamide composition has a delta end group level greater than or equal to 45 µeq/gram.

3. The base polyamide composition of claim 1, wherein the base polyamide comprises greater than 1.4 wt % caprolactam units, based on the total weight of the base polyamide composition, and wherein the base polyamide has a relative viscosity less than 55.

4. The base polyamide composition of claim 1, wherein the nylon mixture of the base polyamide composition comprises:

from 1 wt % to 50 wt % nylon-6; and from 20 wt % to 99 wt % nylon-6,6, based on the total weight of the base polyamide composition.

5. The base polyamide composition of claim 1, wherein the base polyamide composition has a color index ranging from −6 to 5, as measured by ASTM E313 (2018).

6. The base polyamide composition of claim 1, wherein the base polyamide composition has a melting point ranging from 185° C. to 255° C.

7. The base polyamide composition of claim 1, wherein the catalyst composition comprises phosphorous acid; phosphonic acid; alkyl-substituted phosphonic acids; aryl-substituted phosphonic acids; 2-pyridylethyl phosphonic acid; hypophosphorous acid; alkyl-substituted phosphinic acids; aryl-substituted phosphinic acids; alkyl-/aryl-substituted phosphinic acids; phosphoric acid; esters and salts of these phosphorous-containing acids; manganese hypophosphite; sodium hypophosphite; benzene phosphinic acid; monosodium phosphate; or any combinations thereof.

8. The base polyamide composition of claim 1, wherein the base polyamide composition further comprises from 1 wppb to 25 wppm phosphorus.

9. The base polyamide composition of claim 1, wherein the base polyamide composition comprises from 0.1 wppm to 35 wppm catalyst composition.

10. The base polyamide composition of claim 1, wherein the base polyamide composition comprises greater than 1.5 wt % residual caprolactam.

11. The base polyamide composition of claim 1, wherein the base polyamide composition comprises from 1 wt % to 8 wt % residual caprolactam.

12. The base polyamide composition of claim 1, wherein the base polyamide composition has a delta end group level ranging from 50 µeq/gram to 75 µeq/gram.

13. A final polyamide composition prepared by polymerizing the base polyamide composition of claim 1, wherein the final polyamide composition has a residual caprolactam concentration that is at least 5% less than the residual caprolactam concentration of the base polyamide composition.

14. The final polyamide composition of claim 13, wherein the base polyamide composition has less than 0.6 wt % residual caprolactam.

15. The final polyamide composition of claim 13, wherein the final polyamide composition has a color index ranging from −6 to 5, as measured by ASTM E313 (2018).

* * * * *